July 28, 1925.
W. R. BULL
1,547,295
MACHINE GUN TRIPOD
Filed March 28, 1924
2 Sheets-Sheet 1
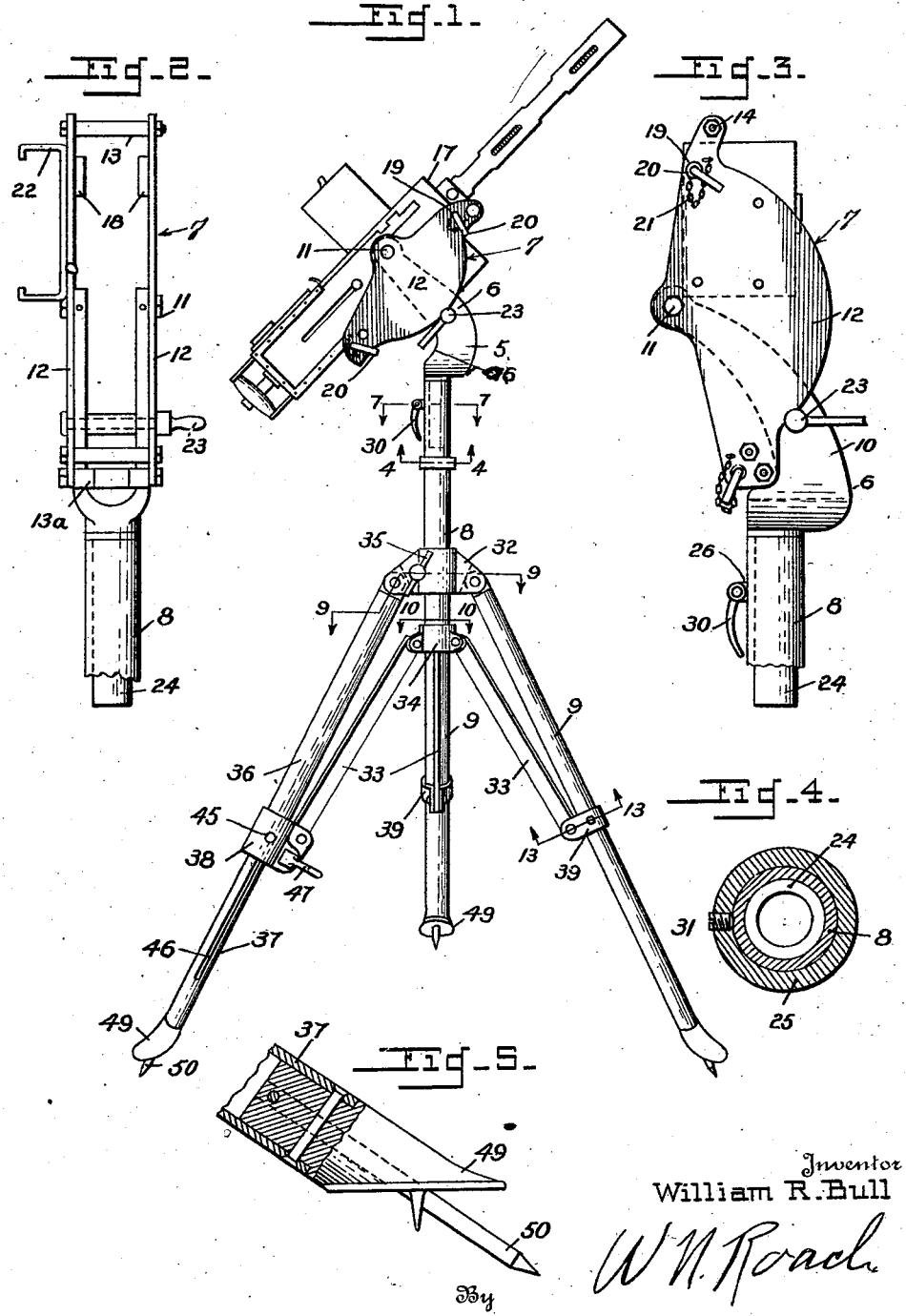
Inventor
William R. Bull
By W. N. Roach
Attorney

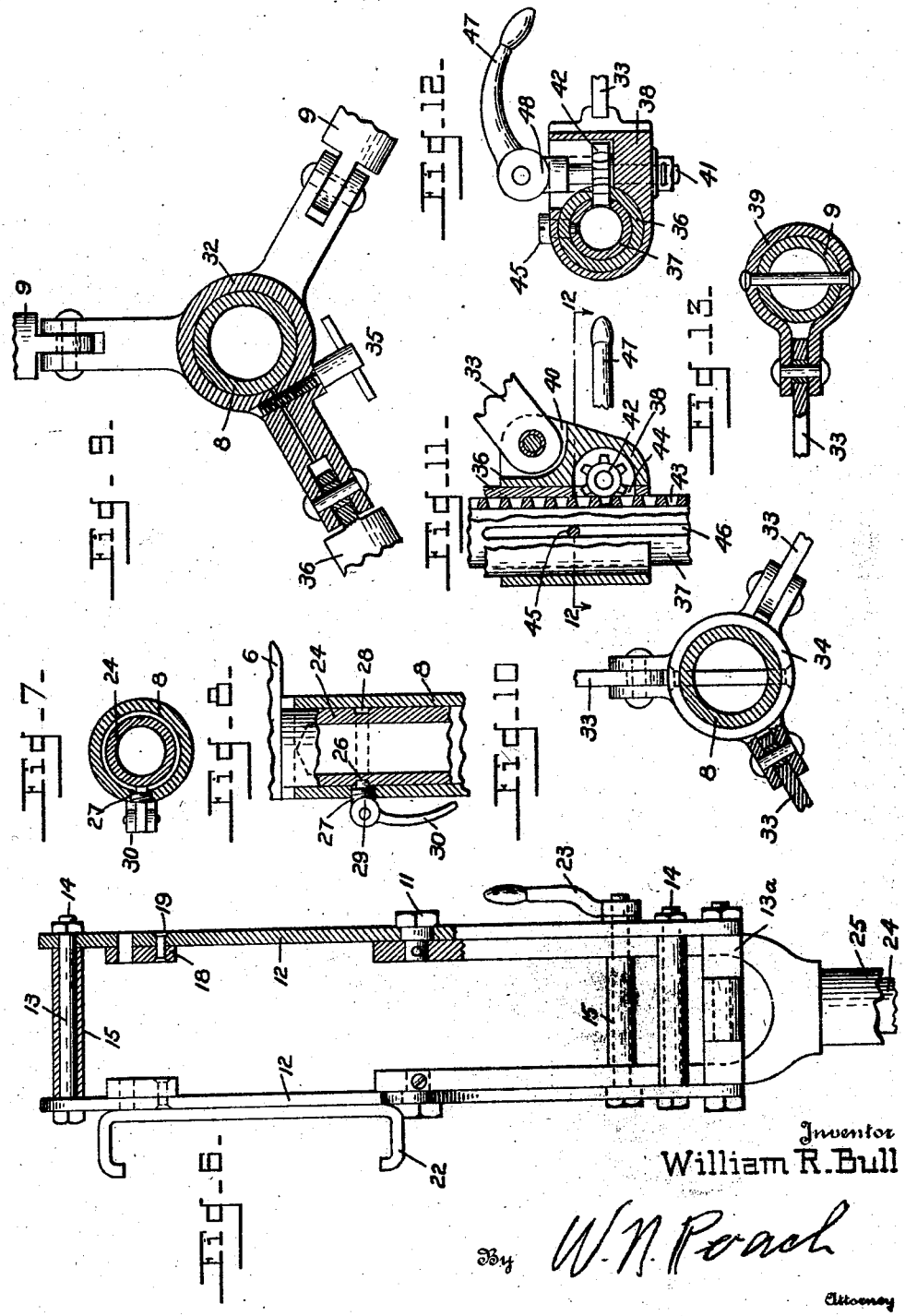

Patented July 28, 1925.

1,547,295

UNITED STATES PATENT OFFICE.

WILLIAM R. BULL, OF SPRINGFIELD, MASSACHUSETTS.

MACHINE-GUN TRIPOD.

Application filed March 28, 1924. Serial No. 702,642.

(GRANTED UNDER THE ACT OF MARCH 3, 1883; 22 STAT. L. 625.)

*To all whom it may concern:*

Be it known that I, WILLIAM R. BULL, a citizen of the United States, and a resident of Springfield, county of Hampden, and State of Massachusetts, have invented an Improvement in Machine-Gun Tripods, of which the following is a specification.

The invention described herein may be used by the Government, or any of its officers or employees in prosecution of work for the Government, or by any other person in the United States, without payment to me of any royalty thereon, in accordance with the act of March 3, 1883.

The present invention relates to machine gun tripods and particularly to the type of tripod used in mounting anti-aircraft machine guns.

The primary object of this invention is the provision of a machine gun mount so constructed that when the gun is in position and being fired, vibration will be reduced to a minimum and accurate firing maintained.

A further object of the invention is the provision of a mount constructed so that the machine gun mounted thereon may be swung in azimuth through an arc of 360° and in elevation through an arc of approximately 180° so that the gun may be directed and fired at any angle with accuracy and without undue vibration of the mount.

A further object of this invention is the provision of locking means particularly adapted for use on the tripod legs and other adjustable parts whereby these parts may be securely locked in any position of adjustment.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A preferred embodiment of my invention is illustrated in the accompanying drawings, in which, Fig. 1 is a side elevation of a tripod mount such as forms the subject of this invention with a machine gun positioned therein;

Fig. 2 is a near view of the gun cradle and yoke;

Fig. 3 is a side elevation of the parts shown in Fig. 2;

Fig. 4 is a section on the line 4—4 of Fig. 1;

Fig. 5 is a detail view of a tripod foot;

Fig. 6 is an enlarged rear elevation partly in section of the cradle and yoke;

Fig. 7 is a section on the line 7—7 of Fig. 1;

Fig. 8 is a vertical section through the parts shown in Fig. 7;

Fig. 9 is a section on the line 9—9 of Fig. 1;

Fig. 10 is a section on the line 10—10 of Fig. 1;

Fig. 11 is a detail view partly in section of the leg adjusting means;

Fig. 12 is a section on the line 12—12 of Fig. 11; and

Fig. 13 is a section on the line 13—13 of Fig. 1.

Referring to the drawings by numerals of reference:

I have shown a tripod mount 5 embodying a yoke 6 adapted to carry a cradle 7 and supported by a central standard 8 mounted on the legs 9. The yoke 6 is formed, preferably, as a U-shaped member, being provided with upstanding spaced arms 10, upon which are pivotally mounted as by means of trunnions 11, the spaced side plates 12, which with the rests 13 and the rest 13ª, comprise the gun cradle. The rests 13, in the preferred embodiment of my invention, consist of bolts 14 connecting the side plates 12 of the cradle together at appropriate points and carrying spacer sleeves 15, which serve to maintain the side plates 12 in proper spaced relation. If desired, one or more rests 13ª, shaped to conform to the parts of the gun which rest upon them, may be secured at appropriate points on the cradle to more securely support the gun.

The gun rests 13, may be of any desired form and may be positioned wherever necessary, the lowermost rear rest, however, will preferably be so located that, when the cradle is swung into a vertical position, the machine gun 17 itself will be directed vertically. To enable vertical aiming and firing, therefore, I preferably construct the arms 10 with aligned recesses 16 on one side to receive the lowermost rear rest when the cradle is in vertical position and thereby permit vertical firing of the gun. By locating the rests 13 and 13ª, moreover, in proper relation to the trunnions 11 so that the center of gravity of the gun when positioned in the cradle will be substantially coincident with the pivotal axis of the cradle, excessive vibration during fire will be avoided and ready adjustment of the gun in a vertical plane made possible.

For the more secure positioning of the machine gun 17 which may be of any suitable structure in the cradle, blocks 18 may be employed which are attached to the inner faces of the side plates 12 and are pivoted thereon as at 19 and may be locked in place by pins 20 fastened by chains 21 to the side plates. If desired, a bracket 22 may be secured to one of the side plates 12 for the purpose of supporting a cartridge case so that the shells may be properly fed into the gun. A clamp 23 mounted upon the yoke serves to maintain the cradle and the gun positioned thereon in any adjusted position.

The yoke is mounted upon a spindle 24 which fits in the central standard 8 so that the yoke may be rotated about the axis of the spindle. The spindle may be locked in any adjusted position by means of a pin 26 formed on a threaded member 27 which is adapted to seat in a peripheral groove 28 formed on the spindle. The threaded member 27 which is screwed into an opening in the standard 8, may itself be locked against movement by a cam 29 upon the inner end of the handle 30 which is pivoted to the threaded member 27 and by means of which the threaded member 27 may be manipulated, the cam 29 being brought into locking relation with respect to the outer surface of the standard 8 when the member 27 has been rotated sufficiently to bring the pin 26 into locking contact with the base of the groove 28.

While the standard 8 may be supported in any suitable manner, I, preferably employ, however, a tripod mount, such as shown, comprising the legs 9 pivotally connected to a split sleeve 32 slidable upon the standard 8 and maintained in proper spaced relation by means of braces 33 which are pivoted at one end to the legs themselves and at the other end to a collar 34 which is permanently fastened upon the lower end of the standard 8. The sleeve 32 is adjustable upon the standard 8 and may be clamped in any adjusted position by means of a clamping bolt 35, which adjustably connects the spaced ends of the sleeve 32. A collar 25 slidable upon the standard 8 and adapted to be locked in any adjustable position upon the standard by a set-screw 31 serves to limit upward movement of the sleeve 32 upon the standard.

Each of the leg members 9 themselves may be adjustable or extensible if desired, though in practice, I have found it preferable to make one only of these legs extensible. This extensible leg member includes a stationary upper portion 36 and a movable lower portion 37. The sleeve 38 pivotally connecting the brace 33 to the upper portion 36 of this leg is of somewhat different construction from the sleeves 39 which serve to pivotally connect the braces 33 to the other two legs of the tripod. The sleeve 38 is recessed as at 40 to receive the lower end of the respective brace 33 and serves as a support for the shaft 41 upon which is mounted a pinion 42 adapted to cooperate with gear teeth 43 formed upon one face of the lower adjustable leg member 37. To permit proper engagement of the pinion with the gear teeth the upper leg member is slotted as at 44. A pin 45 threaded into the sleeve 38 and passing through the outer leg member 36 and into a slot 46 in the lower leg member 37 serves to prevent rotation of this lower leg member in its adjusting movement. The shaft 41 may be rotated to move the pinion 42 and through the pinion the lower leg member 37 by means of a handle 47 which is pivoted to one end of the shaft 41 and which is provided with a cam inner end 48 adapted to be brought into contact with the outer face of the sleeve 38 to lock the shaft 41 against rotation and the extensible portion 37 in any adjusted position. This locking handle 47 like the handle 30 serves two purposes, it is a manipulating means and a locking means. When the handle 47 is brought into locking position, the shaft 41 is secured against rotation and simultaneously the lower leg member 37 is locked in position.

Since it is essential that when in position accidental movement of the tripod be prevented, I preferably provide the leg members with feet 49 provided with spurs or prongs 50 so positioned as to prevent any accidental movement of the legs.

With a tripod of the structure recited, the center of gravity of the gun when mounted, will be substantially coincident with the pivotal axis about which the gun cradle moves; consequently, it will be comparatively easy to maintain the gun in any adjusted position and undue vibration of the mount itself during firing will be prevented. The mount, itself, is substantially strong in construction, it may be quickly adjusted and by means of locking handles 30 and 47, the adjustable parts may be securely locked in any adjusted position. With a tripod of the structure described, it will be possible to quickly and accurately lay the gun, and to maintain the gun in proper firing position without danger of accidental movement or disadjustment because of vibration.

Having thus described my invention, what I claim is:

1. In a mount for machine guns, a standard, a bracket provided with spaced upright arms formed with aligned recesses pivotally mounted on the standard, a cradle pivotally mounted on the bracket member, said cradle embodying a pair of spaced plates mounted outside respective spaced upright arms, a gun rest connecting the side plates adjacent their ends and adapted to be received in the recesses of the arms when the cradle is swung upwardly, whereby the gun may be swung into a vertical position, the rests and pivotal axis being so positioned with respect to each other that when the gun is placed in the cradle, the center of gravity of the gun will be substantially coincident with the axis about which the cradle moves, and means for locking the cradle in any adjusted position.

2. In a mount for machine guns, a standard, a bracket provided with spaced upright arms formed with aligned recesses swivelly mounted on the standard, a cradle pivotally mounted on the bracket member, said cradle embodying a pair of spaced plates mounted outside respective spaced upright arms, a gun rest connecting the side plates adjacent one end and adapted to be received in the recesses of the arms when the cradle is swung upwardly, whereby the gun may be swung into a vertical position, and means for locking the cradle in any adjusted position.

3. In a mount for machine guns, a standard, a bracket mounted on the standard, a cradle pivotally supported on the bracket and provided with rests for supporting the gun, the rests and pivotal axis being so positioned that when the gun is placed in the cradle the center of gravity of the gun will be substantially coincident with the axis about which the cradle moves.

4. In a mount for machine guns, a standard, a bracket member mounted on the standard, arms on the bracket member, a cradle provided with rests for supporting the gun pivotally mounted on the arms of the bracket member, means on the bracket member adapted to receive the lowermost rear gun rest when the cradle is swung upwardly, whereby the gun may be swung into a vertical position.

5. In a mount for machine guns, a central standard, a bracket rotatably supported on the standard, a cradle trunnioned in the bracket, and means on the bracket to receive the lowermost portion of the cradle when the cradle is swung upwardly, whereby the gun may be swung into a vertical position.

6. In an adjustable leg for tripods, an upper leg member, a lower leg member movable with respect to the upper leg member, a rotatable shaft secured to one of the leg members, a pinion mounted on the shaft and adapted to mesh with gear teeth on the other leg member to move the lower leg member with respect to the upper leg member, a handle for rotating the shaft pivoted to the shaft, said handle formed with a cam face at its inner end adapted to contact with a portion of the leg member on which the shaft is mounted to simultaneously lock the pinion against rotation and the leg in any adjusted position.

7. In an adjustable leg for tripods, an upper leg member, a lower leg member movable with respect to the upper leg member, an actuating member mounted on one of the leg members and adapted to cooperate with the other leg member for moving the lower leg member relative to the upper leg member, a handle for manipulating the actuating member and means on the handle for simultaneously locking the actuating member against movement and the lower leg member in any adjusted position.

8. The combination with a machine gun tripod, of a cradle journaled on the tripod, and means for securing a machine gun in said cradle in such position that the center of gravity of the gun is substantially coincident with the axis of the trunnions.

9. The combination with a tripod leg formed in sections, one of the sections being adjustable with respect to the other, of a lock for the adjustable section including a movable member adapted to engage the adjustable section, a shaft on which the movable member is supported, a member on which the movable member moves, a handle for moving the movable member pivoted to the shaft at an angle to the path of movement of said member, the handle formed with a cam faced inner end adapted to be brought into contact with the member on which the movable member moves whereby to lock the movable member against movement.

10. The combination with a tripod leg formed in sections, one of the sections being adjustable with respect to the other, of a lock for the adjustable section including a movable member, a member on which the movable member moves, a handle for moving the movable member, pivoted to the movable member at an angle to the path of movement of such member, and means on the handle adapted to lock the movable member against movement.

11. The combination with a tripod leg formed in sections, one of the sections adjustable with respect to the other, of a lock for the adjustable section, including a movable member, a member on which the movable member moves, a handle for moving the movable member and cam means on the handle adapted to cooperate with the member on which the movable member moves to lock the movable member against movement.

12. The combination with a tripod leg formed of sections, one of the sections adjustable with respect to the other, of a lock for the adjustable section, including a movable member, a handle for moving the movable member, and means on the handle adapted to lock the movable member against movement.

WILLIAM R. BULL.